United States Patent [19]

Fletcher

[11] Patent Number: 4,484,267

[45] Date of Patent: Nov. 20, 1984

[54] CACHE SHARING CONTROL IN A MULTIPROCESSOR

[75] Inventor: Robert P. Fletcher, Poughkeepsie, N.Y.

[73] Assignee: International Business Machines Corporation, Armonk, N.Y.

[21] Appl. No.: 335,971

[22] Filed: Dec. 30, 1981

[51] Int. Cl.³ .................. G06F 15/16; G06F 9/00; G06F 13/00

[52] U.S. Cl. .................................................. 364/200

[58] Field of Search ... 364/200 MS File, 900 MS File

[56] References Cited

U.S. PATENT DOCUMENTS

| | | | |
|---|---|---|---|
| 4,142,234 | 2/1979 | Bean et al. | 364/200 |
| 4,394,731 | 7/1983 | Flusche et al. | 364/200 |
| 4,399,506 | 8/1983 | Evans et al. | 364/200 |
| 4,400,770 | 8/1983 | Chan et al. | 364/200 |
| 4,410,944 | 10/1983 | Kronies | 364/200 |
| 4,410,946 | 10/1983 | Spencer | 364/200 |

Primary Examiner—James D. Thomas
Assistant Examiner—A. E. Williams, Jr.
Attorney, Agent, or Firm—Bernard M. Goldman

[57] ABSTRACT

The hybrid cache control provides a sharing (SH) flag with each line representation in each private CP cache directory in a multiprocessor (MP) to uniquely indicate for each line in the associated cache whether it is to be handled as a store-in-cache (SIC) line when its SH flag is in non-sharing state, and as a store-through (ST) cache line when its SH flag is in sharing state. At any time the hybrid cache can have some lines operating as ST lines, and other lines as SIC lines.

A newly fetched line (resulting from a cache miss) has its SH flag set to non-sharing (SIC) state in its location determined by cache replacement selection circuits, unless the SH flag for the requested line is dynamically set to sharing (ST) state and if a cross-interrogation (XI) hit in another cache is found by cross-interrogation (XI) controls, which XIs all other cache directories in the MP for every store or fetch cache miss and for every store cache hit of a ST line (having SH=1).

A XI hit signals that a conflicting copy of the line has been found in another cache. If the conflicting cache line is changed from its corresponding MS line, the cache line is castout to MS. The sharing (SH) flag for the conflicting line is set to sharing state for a fetch miss, but the conflicting line is invalidated for a store miss.

8 Claims, 12 Drawing Figures

FIG. 2 (CACHE WITH DIRECTORY IN BCE)

STORE FLOW CHART

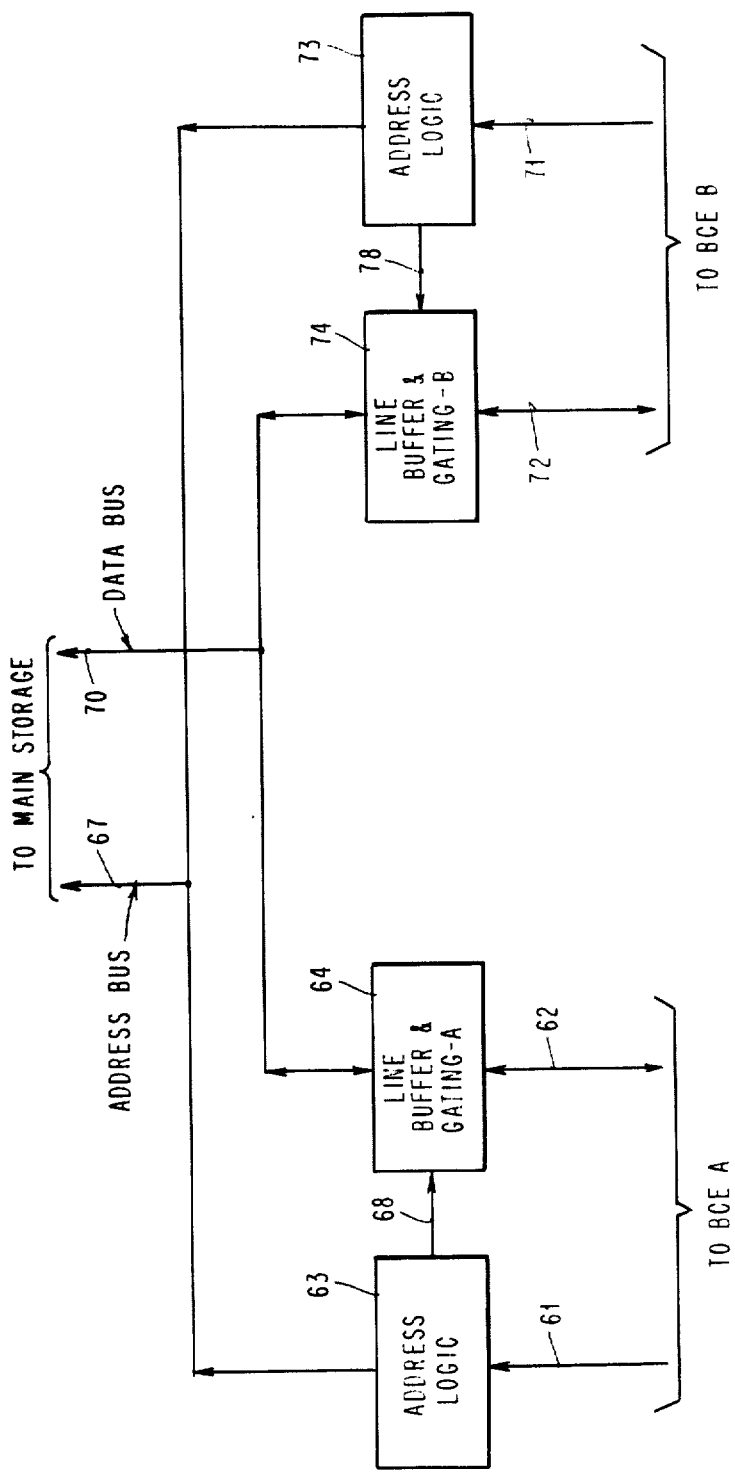
FIG. 6 (SC DATA FLOW SCHEMATIC)

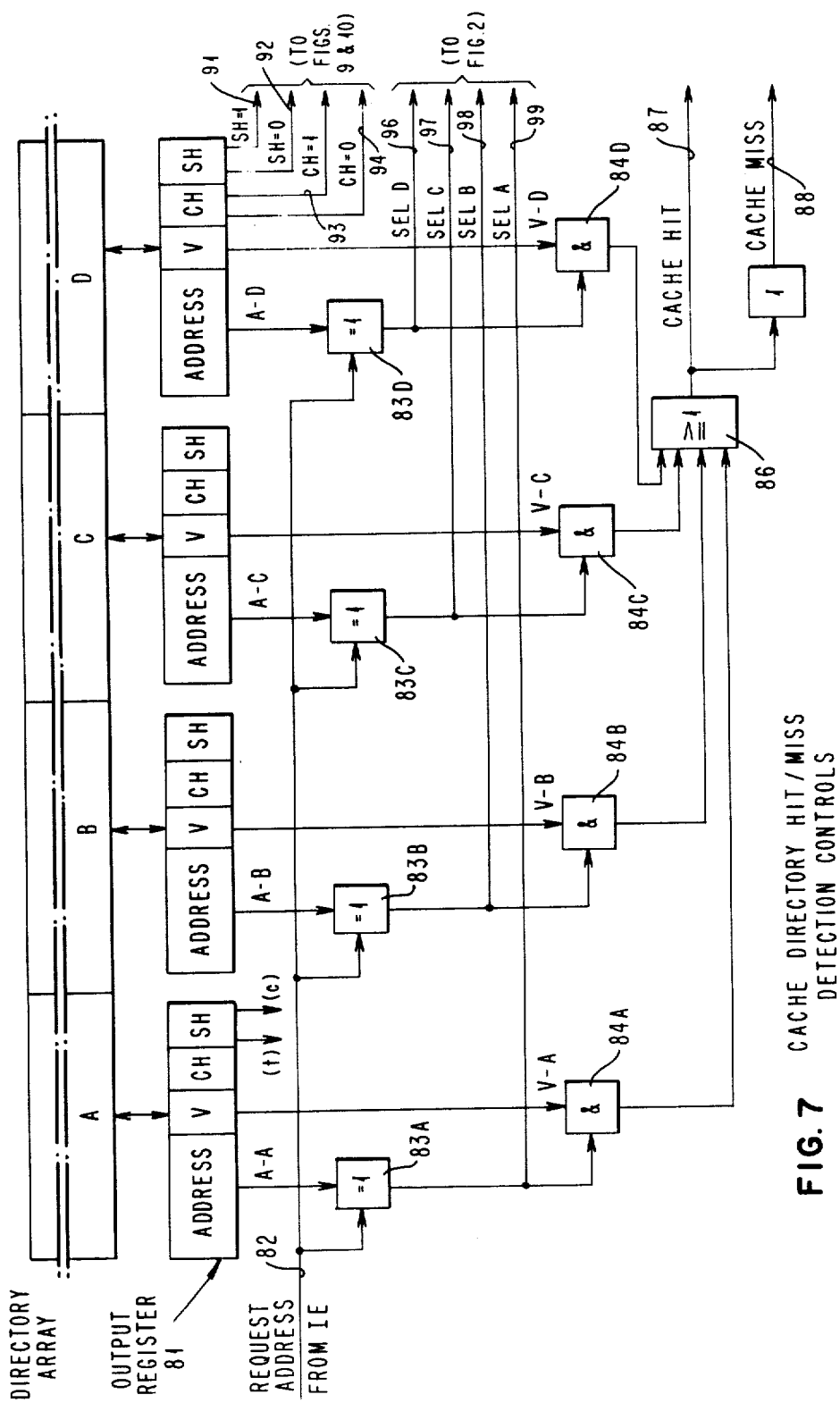
FIG. 7 CACHE DIRECTORY HIT/MISS DETECTION CONTROLS

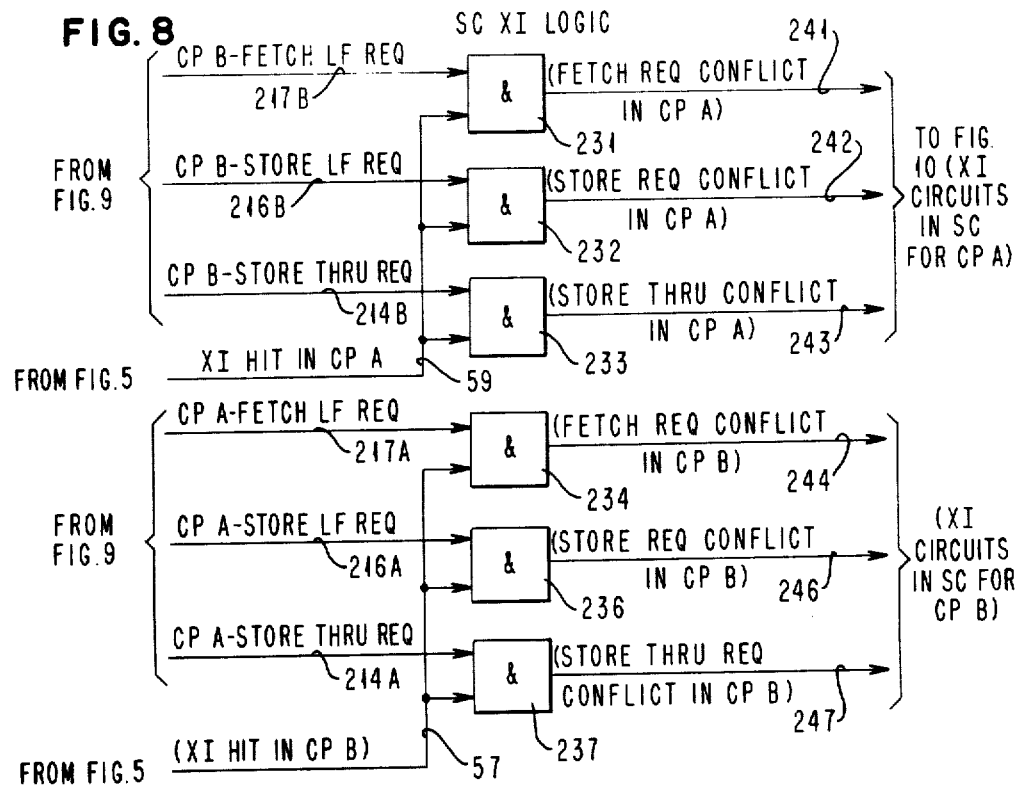
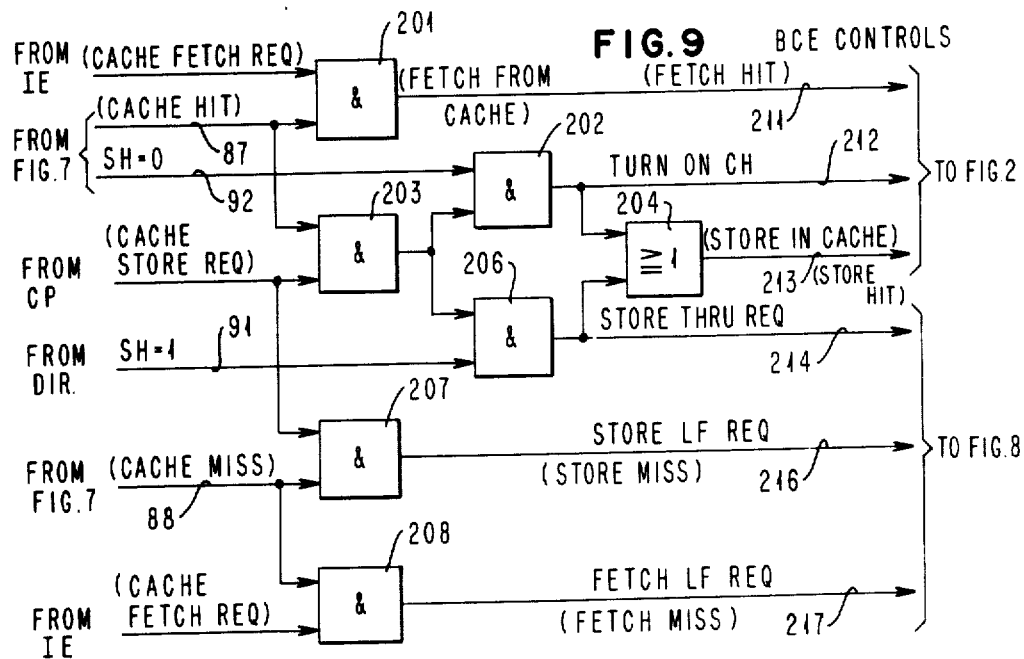

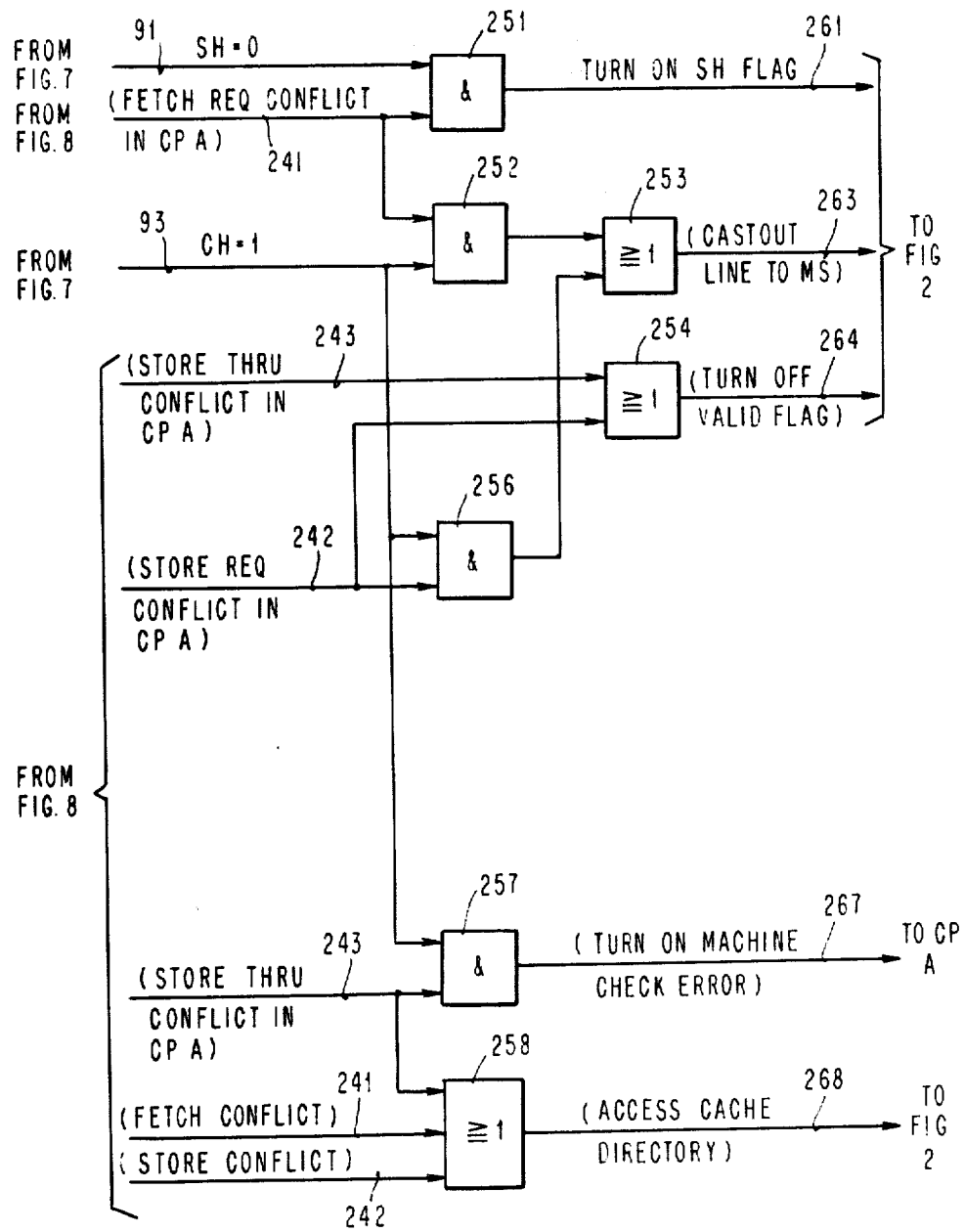

CACHE SHARING CONTROL IN A MULTIPROCESSOR

INTRODUCTION

This invention is in the field of data processing. It is directed to the sharing of a main storage (MS) among a plurality of central processors (CPs) with private caches in a multiprocessing (MP) system.

PRIOR ART

Most high performance CPs (i.e. CPUs) have a private high-speed hardware-managed buffer (i.e. cache) connected to a system main storage to improve the average storage access time for the CP. The cache is usually transparent to a programmer of the system. In shared storage multiprocessing, each CP is always required to use the most recently updated version of data in the MP.

There are different types of caches in prior art MP systems. One type of cache is the store through (ST) cache which does not interfere with a CP storing data directly into the main storage, in order to always update main storage data when that data is changed by any CP in the MP. The ST cache is the type currently implemented in most commercial large CPs. The ST cache immediately sends to MS all stores (which usually average between ten and twenty percent of all CP storage requests). The ST cache requires substantial main storage bandwidth to avoid significantly MP performance degradation. When the number of CPs using ST caches is increased in an MP, the MS bandwidth must be correspondingly increased, which can become prohibitively difficult and costly.

In MP designs where there is insufficient MS bandwidth to make ST caches a viable solution, a store-in-buffer caches (SIC) are often implemented. SICs are described in U.S. Pat. Nos. 3,735,360 and 3,771,137. A SIC cache directory is described in detail in U.S. Pat. No. 4,394,731 by F. O. Flusche et al and entitled "Cache Storage Line Shareability Control For A Multiprocessor System", in which each line in a SIC has its MP shareability controlled by an exclusive/read-only (EX/RO) flag bit. U.S. Pat. No. 4,399,506 issued on Aug. 16, 1983 by C. W. Evans et al and entitled "Store-In-Cache Processor Means For Clearing Main Storage" discloses a CP clear line command which bypasses a SIC cache and causes a specified byte to be stored in a propagated manner in specified line location(s) in main storage. All of these patents are assigned to the assignee of the present invention.

Except for the EX/RO flag, a SIC handles stores the same as fetches. A line must be in a SIC before performing either a store or a fetch. But a ST cache handles stores differently from fetches, wherein a store miss in a ST cache cannot occur because all stores go directly from the CP to main storage while simultaneously updating a copy of the corresponding line if it resides in the ST cache.

If a required line is not in the cache, a cache miss occurs. Only for a SIC, a cache miss due to a store request causes the requested line to be obtained from MS and sent to the SIC. For both a SIC and ST cache, a cache miss due to a CP fetch request causes the line to be obtained from MS and sent to the SIC or ST cache.

Because all CP stores take place in a SIC, the SIC requires a smaller number of main storage accesses compared to a ST cache, so that the SIC requires less MS bandwidth than the ST cache.

A problem with using SIC caches in a multiprocessing system is that the data in main storage is not kept current with the corresponding data in the cache, because when stores are done in the cache they are not done in main storage. Consequently, to insure that each CP accesses the most current data, all SIC directories are cross-interrogated when a CP fetch or store request does not find the requested line in its local private cache (i.e. line miss), in order to determine if the line is presently contained in any other CP cache (i.e. a remote cache) where it may have been changed (i.e. stored into). If the line is not found in a remote cache, the line is fetched from MS to the requesting CP's cache. If the line is in a remote cache but is not changed, the line is invalidated in the remote cache by setting the line's valid flag to zero, and the line in MS is then known to be current and is transferred from MS to the requesting CPs cache. But, if the line is in a remote cache and is found to be changed, the line must first be castout of the remote cache to MS before invalidating the line in the remote cache; and then the requesting CP fetches the changed line from MS to its SIC, so it can thereafter perform the store or fetch request from the local CP.

Thus, the castout movement of a changed line (which takes place on a cross-interrogate hit) entails substantial system overhead, because the remote processor's cache must send the changed line to MS from which the line is obtained by the requesting CP's cache. Thus, both CP's encounter interference and lost time when a changed line conflict is found between SICs. Even worse, many times a relinquishing SIC wants the line back shortly after giving it up, and the line castouts ping-pongs between the SICs.

SUMMARY OF THE INVENTION

The present invention is provided in a multiprocessing (MP) system in which a novel hybrid cache control is provided for each directory with each private CPU cache. The hybrid cache control selectively combines certain features found in a "store-in-buffer" cache (SIC) and a "store through" (ST) cache to obtain a synergistic result of better system performance than when either type of cache is used alone. Yet, the hybrid cache control need not be more complicated or costly to implement than the prior SIC and its controls.

The hybrid cache control provides a sharing (SH) flag with each line representation in each private cache directory in an MP to uniquely indicate for each line in the associated cache whether it is to be handled like a SIC line or like a ST line. At any time the hybrid cache can have some lines operating as ST lines, and other lines as SIC lines; usually most of its lines are operating as SIC lines, for example, perhaps 10% to 20% of the cache may on the average be designated as ST lines.

Initially all SH flags in the hybrid cache are reset to a non-sharing (SIC) state to designate SIC operation, such as on power-on, microprogram load, or initial program load (IPL).

As a result of a cache miss, a newly fetched line also has its SH flag set to non-sharing state in its newly selected location in the cache determined by the cache replacement selection circuits, but the SH flag sometimes may be set to sharing (ST) state by the current cross-interrogation (XI) operation in the following manner.

Every store miss or fetch miss causes a cross-interrogation (XI) of all remote cache directories.

If a XI miss occurs (i.e. no line conflict among the caches), the sharing flag in the local cache remains in the non-sharing state (SH=0) set by the cache replacement selection circuits, and the line is handled as a SIC line.

If a XI hit occurs, it signals that a conflicting version of the line has been found in a remote cache. If the conflicting line is changed, it must be castout of the remote cache to main storage (MS). But, on a XI hit, the setting of the sharing flag for the line in the remote cache directory is dependent on whether a store miss or fetch miss occurred in the local requesting cache.

If a local store miss has occurred, the remote copy of the conflicting line is always invalidated, because the requesting CP must store into the line after it is received by its local cache and therefore must have exclusive control over the line in the local cache. Therefore, the invalidation of the line in the remote cache avoids having two different versions of the same line in the MP. But only if the line was changed (CH flag is on) is the conflicting line castout to MS, and such castout occurs before the line is invalidated.

But if a local fetch miss has occurred, the sharing flag for the remote line is set to sharing state, since after the line is fetched into the local cache, it will not be changed by the current request, so that the line can therefore remain valid in the remote cache where it also can be fetched from.

If while the sharing flags are in sharing state for the same line in two or more CP caches, and any CP requests to store into the line in its cache, the store operation immediately occurs into the CP requested cache and into MS. If the line is not in the local cache, a store miss and line fetch occur, after which the store occurs to the line in the local cache and in MS. On the XI for the store miss, any copy of the line in any other cache is invalidated (V=0). The sharing flag for the local line that is stored into remains in, or is set to, sharing state, even though the line is now only in the storing CPs cache, and it still operates as a ST line in order to keep the corresponding line in MS updated. Thus, if at a future time another CP requests this same line, no castout of this line is required from the storing cache.

The switching of the sharing flag (e.g. setting it to zero or one) is automatically controlled by the hardware, and the system user is not aware of its operation.

The sharing (SH) flag can replace and eliminate the need for the exclusive/read-only (EX/RO) flag bit with each line representation in each private cache directory of the SIC type described in U.S. Pat. No. 4,394,731.

The SH flag need not be set by an IE command, while the prior EX/RO flag is set by an IE command to either EX or RO state, because the SH flag is set dynamically to sharing state when a line is detected to reside in more than one cache.

In both local and remote caches, the sharing state (SH=1) in this invention is not the same as the shareable read-only (RO) state for the prior EX/RO flag, because any CP having a line in sharing state of this invention can immediately store into the line in its cache; while a line with the prior shareable RO state cannot be stored into until after the state of the line is changed from RO to EX state which required refetching the line from MS.

In a local cache (but not in a remote cache), the non-sharing state (SH=0) in this invention operates similarly to the exclusive (EX) state of the prior EX/RO flag, because any CP cache having a line in the non-shared state of this invention is exclusively in that one cache which can fetch and store into the line in a SIC manner. However, in prior caches with the EX/RO flags, storing can only occur when a cache line has the EX state. But with this invention, storing can occur for a cache line in either non-sharing (SH=0) or sharing (SH=1) states.

Hence, the sharing flag (SH) control provided by this invention differs significantly from the read-only flag (EX/RO) control disclosed in U.S. Pat. No. 4,394,731. Thus, when the SH flag is set to sharing state, a cache line is not read-only because it is available there for being immediately stored into. A line's plural cache residence exists as long as fetch requests are being made to it in the plural caches, and the plural cache residency terminates after the first store request to the line is made to any of the plural caches. The first store request hitting the line in any of the plural caches invalidates all other copies of the line in the other of the plural caches, leaving the line exclusively in the cache of the first storing CP. No cache miss occurs and no change is made to the sharing state as a result of the store request. This has an advantage over the prior RO flag operation, wherein a store request to a RO line causes a cache miss and a resulting line fetch from MS. Hence, when the SH flag is set to sharing state (e.g. SH=1), storing is still permitted at the normal cache speed, e.g. one machine cycle. No store operation to any cache line is interrupted by a cache miss.

Therefore, whenever plural CPs alternately store into a line marked as shared (SH=1) the CPs alternately take exclusive control over that line in MS with only one castout occurring from any cache receiving the first store request only if the CH flag is on; but with the prior EX/RO flag (which must be set to EX state while storing is being done to a line), alternate castouts to MS are required when switching control over that line from one CP cache to another CP cache. Thus, no castout ping-ponging occurs with the SH flag operation of this invention as occurs with the prior EX/RO flag operations.

That is, the dynamic control by this invention over the sharing flags eliminates the ping-ponging of castouts of lines between caches after any first castout, because the sharing flag will be in sharing state for the line in both the local and remote CPs which thereafter can store into the same line in main storage so that no future castout is needed for the line. After a line is marked for sharing, cross-interrogation operations to remote CPs can thereafter only ping-pong the invalidation and line fetch operations from MS to the requesting CP cache, but no castout ping-ponging can occur, which correspondingly decreases: (1) the CP access time for a store request, (2) interference time for the remote CP, and (3) MS traffic due to fewer castouts.

The hybrid cache control achieves a reduction in main storage bandwidth when compared to a conventional ST cache, because the hybrid cache control is only occasionally required to send stores to MS since lines are only occasionally shared. The prior ST cache indiscriminately sent all stores to main storage, although it did not correspondingly store into the cache unless the required line was in the cache. With this invention, the required line must always be in the cache for a ST operation. Analysis of CP execution traces indicate that the hybrid cache control may eliminate about 75% of the store-throughs that occur with a conventional ST cache. Consequently, better MP performance is attainable with the invention when compared to conventional ST cache operation.

The hybrid cache control also achieves a MP performance improvement over the prior SIC cache operation by providing a reduction in castout overhead, since in this invention a castout only occurs once for a changed line when it is dynamically set to sharing state, and hence castouts cannot ping-pong on later stores to the same line in different CP caches. This substantially decreases the average CP access time to MS for store misses.

Thus, the concept found in this invention is that a line in backing main storage need not be kept current except for the special case where the line is subject to both sharing and changing. If either one of these two conditions is missing, there is no need to continuously update the line in backing storage; and the faster access time found with SIC caches can be obtained for CP store hit requests. Therefore, there is no store-through to any line in backing memory unless both the sharing and changing conditions dynamically exist for that line. Consequently, the traffic to backing storage is reduced, since there is no "store through" for changes to non-shared lines. By the same token, much of the line castout overhead occurring with SIC caches is avoided.

These and other objects, features and advantages of the invention may be more fully understood and appreciated by considering the following detailed description in association with the accompanying drawings.

BRIEF DESCRIPTION OF THE DRAWINGS

FIG. 6 is an overview of the SC data bus and address bus controls.

FIG. 7 shows the CP cache directory hit/miss detection circuits.

FIG. 8 shows SC cross-interrogation control circuits.

FIGS. 9 and 10 shows SC control circuits provided for communicating to each CP connected to the SC.

FIG. 11 illustrates the tag bits in each line entry in each CP cache directory.

FIG. 12 illustrates the tag bits in each line entry in each copy directory in the SC.

DESCRIPTION OF THE EMBODIMENT

Figure 1:
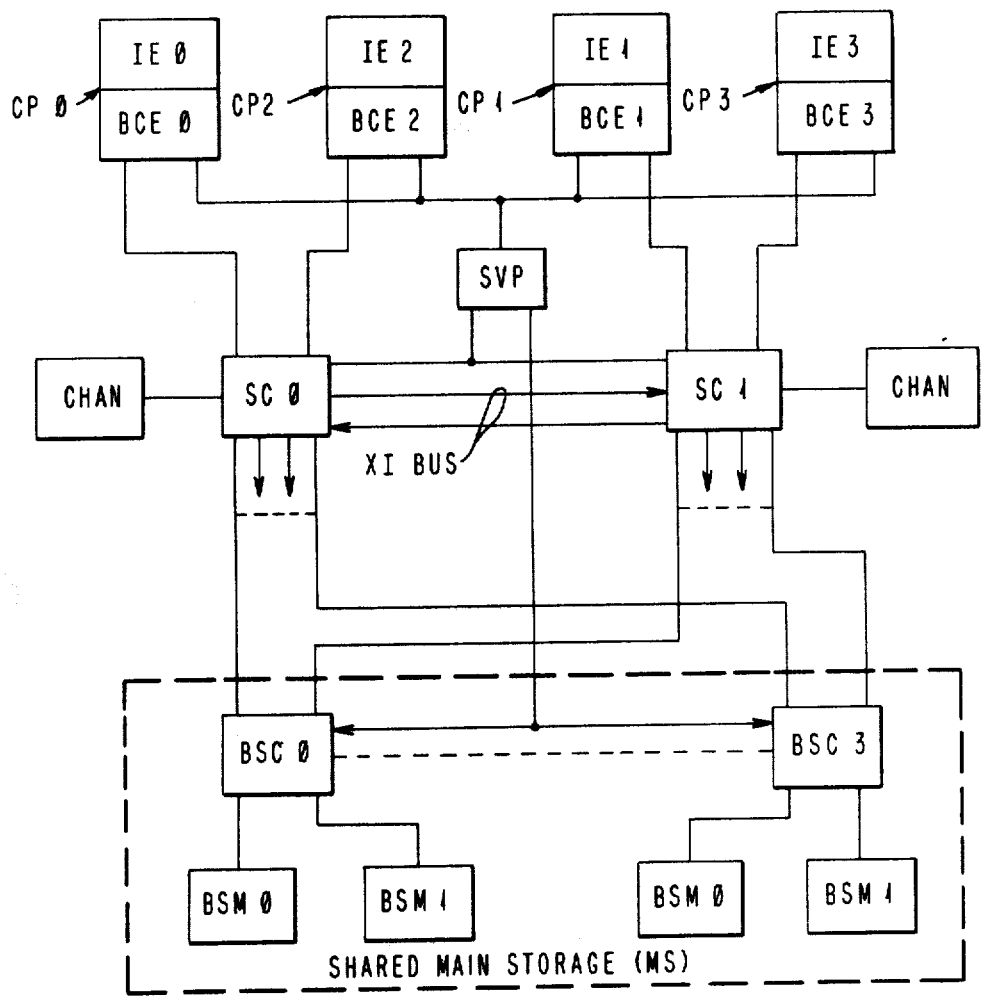
FIG. 1 is a block diagram showing the cache and directory in a multiprocessing configuration.

The invention is described in relation to a multiprocessor (MP) having four central processors designated CP0 through CP3 as shown in FIG. 1, but the invention can be used in an MP with any reasonable number of CPUs. Each CP has an instruction decoding and execution element (IE) and a buffer control element (BCE) containing a private CP cache, its directory and controls. Each BCE accesses a shared main storage (MS) through a storage (or system) controller (SC). The MS may instead be a second level (L2) cache (which may be a SIC type) which is shared by all CPs wherein the L2 cache in turn accesses MS; and the operation of such L2 cache will be the same as the MS operation described for this embodiment.

Figure 2:
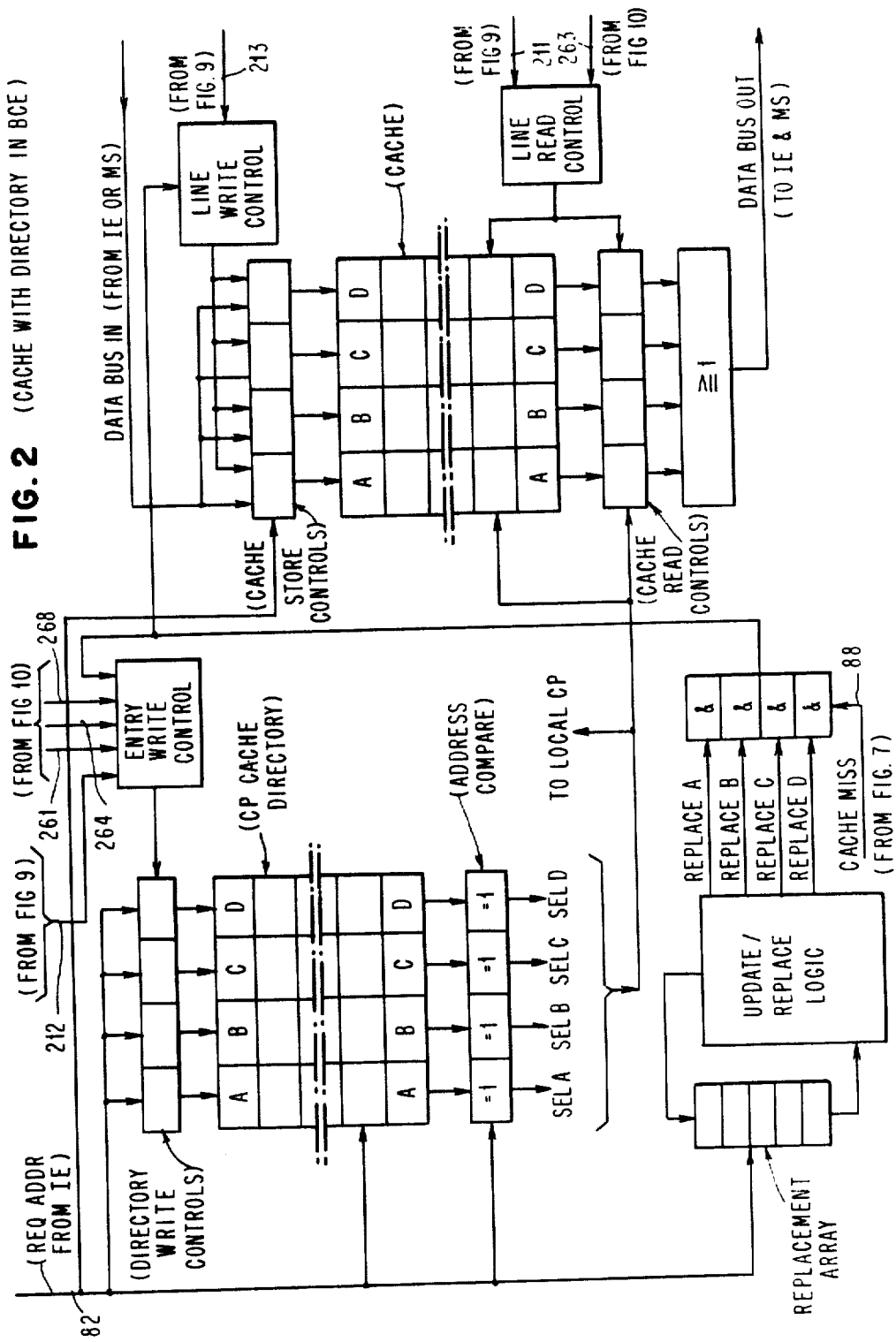
FIG. 2 is a detailed block diagram of a conventional four-way set associative cache, except for the SH flag bit contained in each cache directory line entry.

FIG. 2 shows the internals of any BCE shown in FIG. 1. The BCE includes a four-way set associative cache, its directory, directory replacement selection circuits and other logic associated with each CP of the type previously described in U.S. Pat. No. 4,394,731 except for the novel sharing (SH) flags and their control circuits, of which an embodiment is provided in the subject specification. The entire specification of U.S. Pat. No. 4,394,731 is incorporated herein by reference. The processor directory in U.S. Pat. No. 4,394,731 is modified to provide a CP cache directory for the subject invention by replacing the prior EX/RO bit position with a novel sharing (SH) bit position in each line entry in the directory as shown in FIG. 11 herein. Similarly, each SC in the subject embodiment includes copy directories (CDs) of the same type as described in U.S. Pat. No. 4,394,731 except that each CD in this embodiment is modified by replacing the prior EX/RO bit position with the novel sharing (SH) bit position in each line entry in each CD as shown in FIG. 12 herein. Also, the controls for the CP directories and CDs described herein for the embodiment of the hybrid cache controls of this invention are different from those in U.S. Pat. No. 4,394,731.

The subject invention revolves around the controls for the sharing (SH) flags and the change (CH) flags in all cache directories in an MP. These controls are particularly pertinent to store and fetch requests by any CP which fails to find requested data or instructions (both herein called data) in a private CP cache to cause cache misses, to remote CD cross-interrogation, to invalidation of entries in remote CDs and CP directories, and to storing either solely in a CP cache or in both the cache and MS.

In prior ST caches, all stores are made to the main storage, and a remote cache is cross-interrogated only for invalidation since ST caches do not have castouts. A store is made to a local (requesting) CP ST cache only if the line is present in the cache. Consequently, there is no such thing as a "store miss" in a ST cache. For example, cross-invalidation in a MP having ST caches is disclosed, with cross-invalidation filtering claimed, in prior U.S. Pat. No. 4,142,234 to Bean et al entitled "Reducing BIAS Interference in MP" and assigned to the same assignee as the present invention.

In the prior SIC cache, such as disclosed in U.S. Pat. No. 4,394,731, both fetch and store line misses occur, but the SIC cannot store directly to MS, which indirectly occurs only on cache line castout. Stores and fetches are made by the CP into the SIC only after the line has been brought into the SIC from MS. The cross-interrogation of every remote cache is done on each fetch or store line miss, because the required line may exist in a changed form in a remote private cache. Therefore, in a SIC, remote corresponding changed lines cannot simply be invalidated on a XI hit as is done in a ST cache. A changed line in a SIC (indicated in the associated cache directory by the line change flag being on, CH=1), indicates the change has not been made to the corresponding line in MS. Therefore, if a XI hit occurs to a remote SIC changed line, it must be castout to MS before invalidating it so that an updated version of the line is available in MS to all CPs in the MP. A store request in this application corresponds to the store interrogate (SI) request in U.S. Pat. No. 4,394,731.

In the hybrid cache control organization of the present invention, as long as XI indicates no conflict between caches for a requested line, all CP stores to the line go to the CP cache, as in a SIC cache. But, if a XI conflict is detected for a store request to a line, the conflicting remote line is invalidated (i.e. V set to 0) after any castout to MS (castout only if the remote line was changed), and the local line is set to sharing state (i.e. SH set to 1), so that the current and subsequent store requests by the local CP to that line will go to both MS and the local cache as long as that line resides in that CP cache. This local CP cache line will always be identical to its corresponding MS line after each local store occurs. If another CP requests to store into the same line, the latter CP causes its SC to look for a conflict in the copy directories for all other CPs and to invalidate the line in any other CP cache in which it is found (i.e. if a XI hit). Consequently, any processor to store into a SH=1 line will XI and invalidate any copy of the line in any remote cache.

The ability of the hybrid cache controls to permit the same line to reside in multiple caches until the first store occurs, as in a store-through cache, is particularly important for sharing instructions between CPs. It is rare that any store will take place in instructions. Approximately 15% of requests for operands are store requests.

Eventually a CP will stop using a line in its cache and the line will age out of the cache in the conventional manner as it is replaced in the cache directory by LRU replacement selection circuits which select a directory entry location in a selected congruence class for a new line in the cache required by a fetch or store miss.

The LRU replacement selection circuits will then set the corresponding line directory locations valid (V) bit to invalid state (V=0), the change bit (CH) to unchanged state (CH=0), and the sharing bit to non-shared state (SH=0). Then the new line is fetched from MS and is put into that cache location which then has its directory valid bit set to valid state (V=1). If there was no XI hit for the current request, no conflicting line exists in any other CP cache, the sharing bit remains in non-shared state (SH=0) and the change bit remains in unchanged state (CH=0) in the local cache directory until, and if, later dynamically switched.

If in the invention, a "fetch miss" results in a XI hit of a changed line in a remote cache, the conflicting line is castout to MS and fetched by the requesting CP cache, but the remote line is not invalidated. Instead, the remote line's SH flag is turned on (SH=1) in both the requesting CP cache and remote CP cache. Thus, the line can reside in both caches until after a store is made to either cache copy of the line, at which time a store-through status begins for the copy of the line in the store requesting CP cache, and a XI hit invalidates the copy of the line in every other cache.

Similarly, on a "store miss" and a XI hit in the remote cache, the remote line is invalidated in the remote cache and the SH bit in the requesting CP cache is set to sharing state (SH=1). If the line is changed in the remote cache, it must be castout before invalidating it. The key point is that, if this line continues to be shared and changed, the SH flag eliminates the need for any further castout, because the corresponding line in main storage is being kept current by the store-throughs. Consequently, no second castout is ever required as would be the case with a SIC cache.

Figure 3:
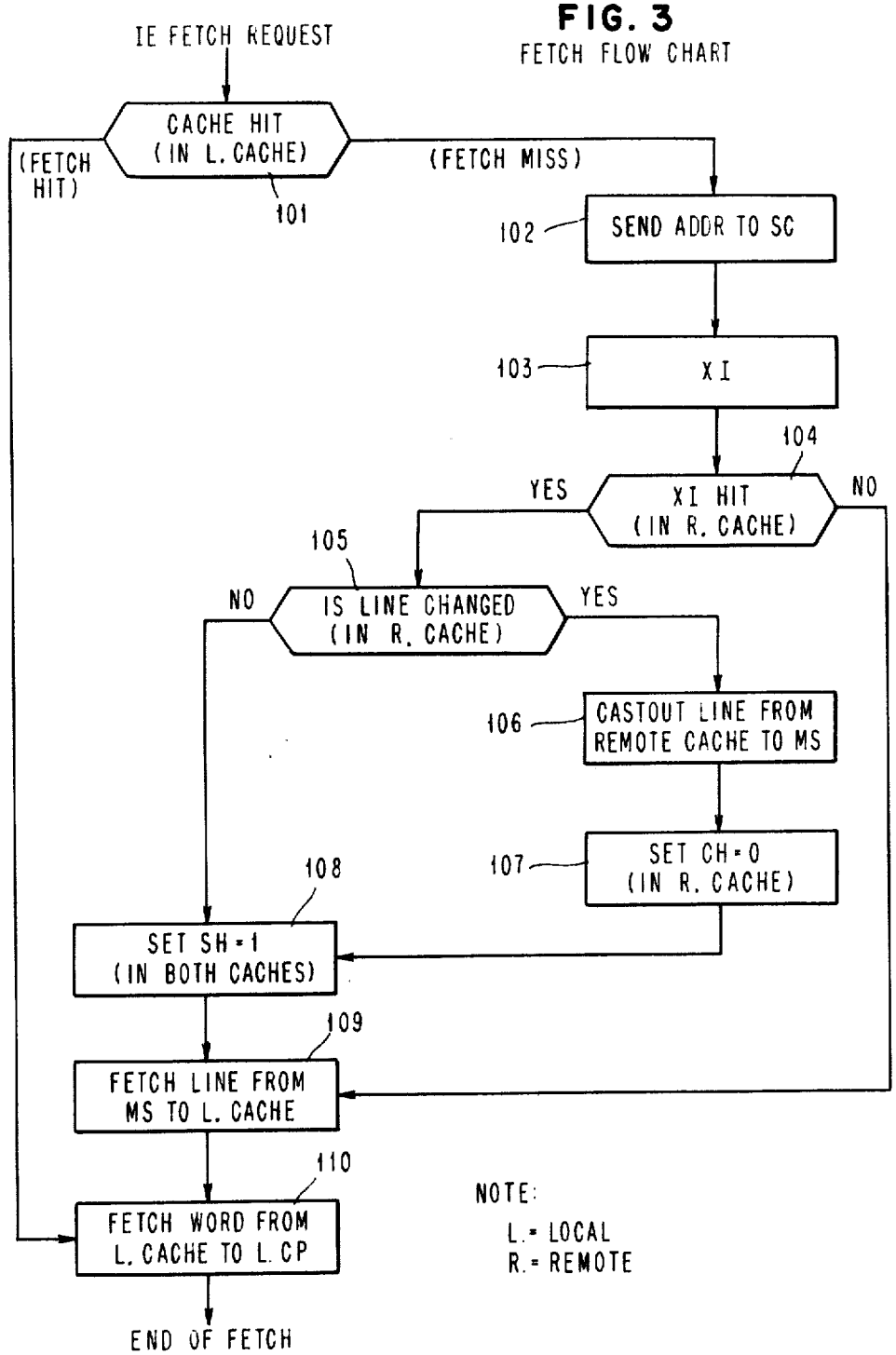
FIG. 3 is a flow chart for a "Fetch" request in the invention.
Figure 4:
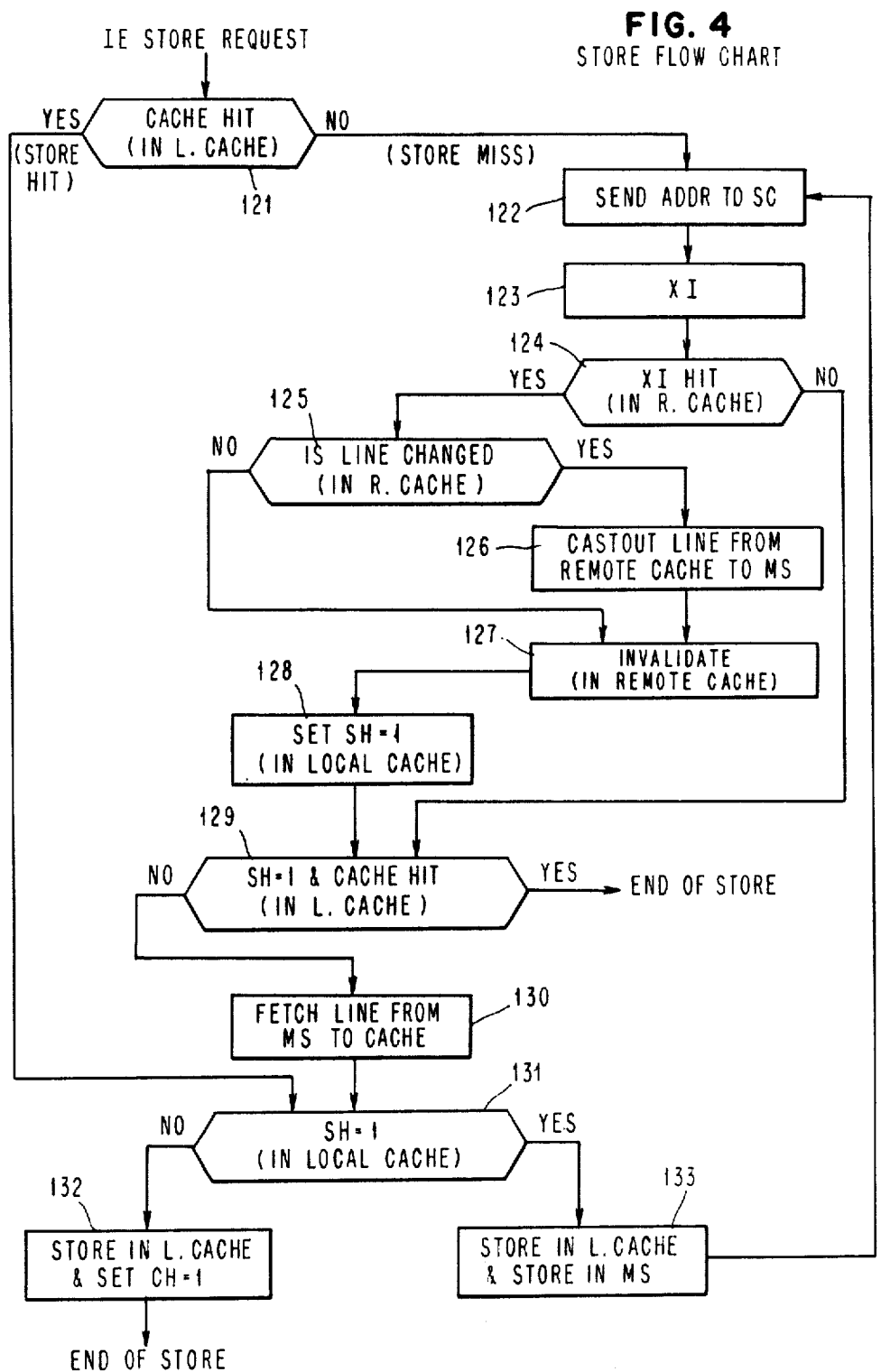
FIG. 4 is a flow chart for a "Store" request in the invention.

Operation of the hybrid cache control is defined using the flow charts in FIGS. 3 and 4 and the following TABLE which lists the operations which control the settings for the sharing flag (SH) and change flag (CH) under all conditions. A dash "-" in the TABLE indicates a don't care condition for the existing state of a flag bit, i.e. which may be either 0 or 1, during the XI operation.

TABLE

| REQ CP Cache Output | Remote CP Cache Response | | | Requesting CP Cache Response | | |
|---|---|---|---|---|---|---|
| | SH | CH | | SH | CH | |
| Fetch Miss | 0 | 0 | For XI Hit, Set SH = 1. | — | — | Fetch Line From MS & Set SH = 1. |
| | 0 | 1 | For XI Hit, Castout Line to MS & Set SH = 1. | — | — | Fetch Line From MS & Set SH = 1. |
| | 1 | 0 | For XI Hit, No Action Required. | — | — | Fetch Line From MS & Set SH = 1. |
| | — | — | XI Miss Indicates No Conflicting Line. | — | — | Fetch Line From MS & Reset SH = 0 and CH = 0. |
| Store Miss | 0 | 0 | For XI Hit, Invalidate. | — | — | Fetch Line From MS & Set SH = 1. |
| | 0 | 1 | For XI Hit, Castout Line to MS & Invalidate. | — | — | Fetch Line From MS & Set SH = 1. |
| | 1 | 0 | For XI Hit, Invalidate. | — | — | Fetch Line From MS & Set SH = 1. |
| | — | — | XI Miss Indicates No Conflicting Line | — | — | Fetch Line From MS & Reset SH = 0 and CH = 0. |
| Store Hit | — | — | No XI Operation | 0 | — | Store In Cache & Set CH = 1. |
| | 1 | 0 | For XI Hit, Invalidate Line. XI Miss Indicates No Conflicting Line. | 1 | — | Store Thru To MS, Store In Cache & Leave CH = 0. |
| Fetch Hit | — | — | No XI Operation. | — | — | Fetch From Cache. |

FIG. 3 shows the method steps 101-110 for a fetch request to a local CP cache directory and is self-explanatory for the various conditions, including: fetch hit or miss, XI hit or miss, conflicting remote line change (CH) bit existing states, and setting the sharing (SH) bit states.

FIG. 4 shows the method steps 121-133 for a store request to a local CP cache directory and also is self-explanatory for the various conditions, including: stored hit or miss, XI hit or miss, conflicting remote line change (CH) bit existing states, and setting the sharing (SH) bit states.

Figure 5:
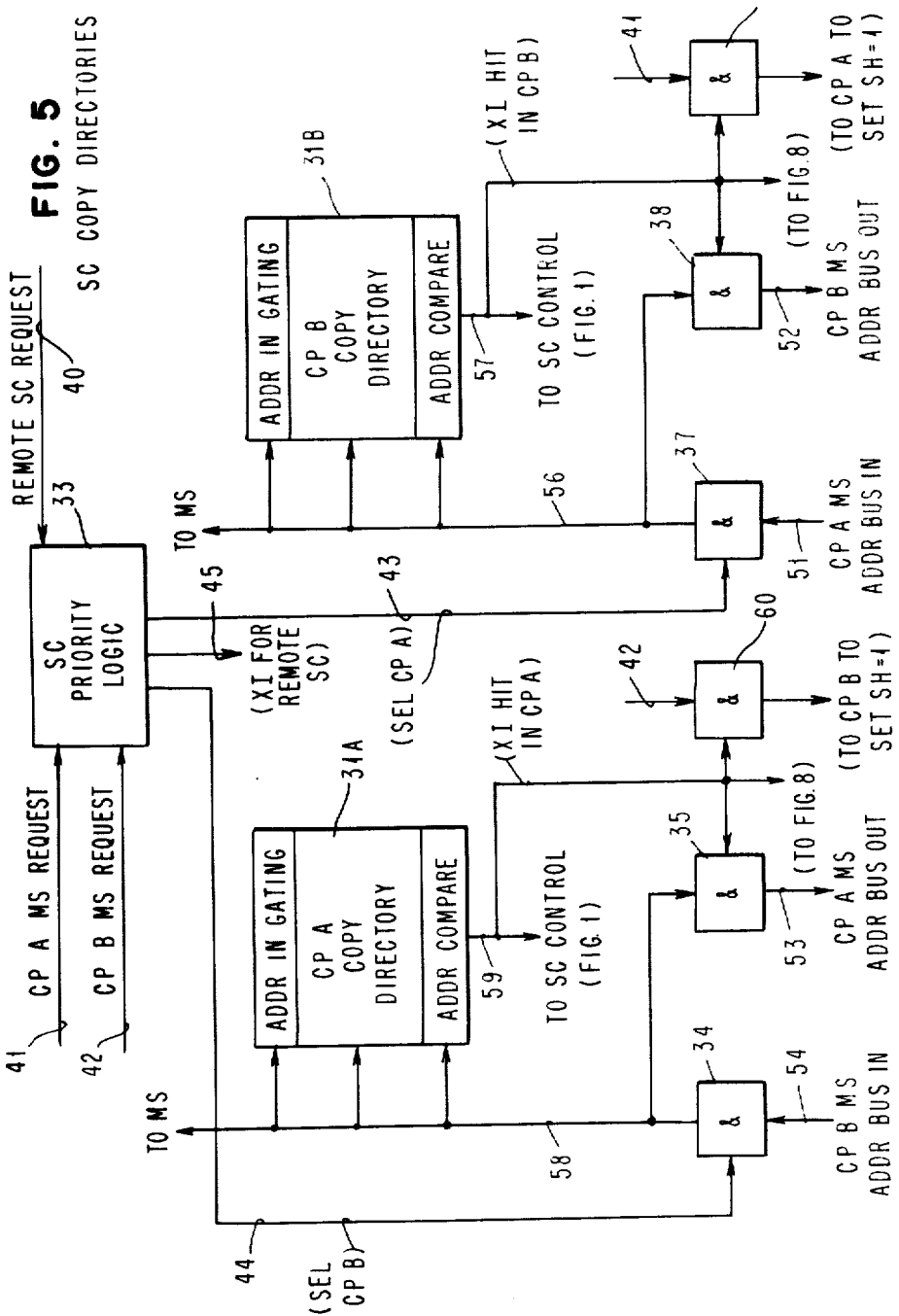
FIG. 5 shows the SC cache copy directories used for cross-interrogation.

Each SC in FIG. 1 handles cross-interrogation (XI) requests from any CP in the MP for determining if a line requested by any CP is located in some other CP's cache. This is accomplished by cross-interrogating all copy directories (CDs) in all SCs for the other CPs. Each SC has two CDs for the two CPs (called A and B herein) which directly connect to the SC. In FIG. 5, a miss by CP A cross-interrogates the copy directory 31B for CP B, and a miss by CP B cross-interrogates the copy directory 31A for CP A. The XI request also is sent on the XI bus shown in FIG. 1 to the other SC in the manner described in U.S. Pat. No. 4,394,731 wherein each CP cache miss is tested in all CDs in all SCs in the MP to determine if the requested line is in any other CD to determine if a XI hit exists in any other CP cache.

The line representations in directories 31A and 31B are shown in FIG. 12 and relate to corresponding line representations in the respective BCE private cache directories. No change (CH flag is provided in the SC directories, because the change flag is switched by any CP store request rather than only by a less frequent cache miss and hence the CP caches can perform faster with the CH flags only in the CP directories.

In FIG. 5, SC priority circuits 33 determine which of requesting CPs A or B or a remote SC request, respectively provided on lines 41, 42 or 40, will get the next SC cycle to handle a XI request in the manner described in U.S. Pat. No. 4,394,731. Priority circuits 33 respond to one of these requests at a time to provide a SELECT CPU A, SELECT CPU B, or an XI for a remote SC by providing a gating signal on line 43, 44, or 45, respectively. FIG. 5 shows details for handling a request from CP A or CP B, but does not show detailed circuits for handling the XI request which examines both CDs 31A and 31B and signal the remote SC if a XI hit is found in either as well as signalling the CP A or CP B having such conflicting line.

AND gates 34 and 35 are associated with copy directory 31A, and AND gates 37 and 38 are associated with copy directory 31B.

Consider the situation in which CP A has successively interrogated its CP cache to fetch a line, and a fetch miss has occurred. Then the BCE of CP A sends a miss signal to the SC on a CPU A MS address bus in line 51 to AND gate 37. While CP A is making the request, priority circuits 33 provide a select CP A gating signal on line 43 to AND gate 37 which transfers the CP A request address on output line 56 to MS and also conditions AND gate 38.

If there is a XI miss (that is, if the CP A request address is not found in CP B's copy directory 31B), then no line conflict exists, and no XI hit (i.e. XI miss) is signalled to CP B on a line 57. Accordingly, AND gate 38 remains disabled at this time.

If, on the other hand, an XI hit is signalled on line 57 that the requested address has been found in directory 31B, gate 38 is activated to provide a gating signal on CP B MS address bus out line 52 to the BCE for the requesting CP directory to have the address of its line location which has a conflicting copy in a remote CP. Line 57 also provides an input to the SC command circuits FIG. 8. And importantly for this invention, line 57 also provides an input to an AND gate 55 which is conditioned by a CP A MS request on line 41. An output from gate 55 sends a signal to the BCE for CP A to turn on the SH flag (SH=1) in the directory entry for the line being requested by CP A. An AND gate 60 operates similarly to turn on the SH flag for a requested line in the directory for CP B when there is a line conflict with a remote CP cache.

FIG. 6 is a SC schematic for illustrating how data flows through the SC between a BCE and MS. The CP A address is provided on line 61 to SC address logic network 63 and one line 62 to or from line buffering and gating circuits 64. The address logic network 63 provides an address signal to the main storage address bus 67. Address gating information is provided on lines 68 to line buffer and gating network 64, which responds by gating the data between lines 62 and data bus 70 to or from main storage.

Likewise, CP B provides address information on bus 71 to address logic circuits 73 to address bus 67, and CP B receives or sends data on bus 72 to or from line buffer and gating circuits 74 and logic circuits 73 to main storage data bus 70.

FIG. 7 shows the entry format of pertinent information in the four associative entries in any selected congruence class in an output register 81 or and CP cache directory. Conventional address compare circuits represented by Exclusive-OR circuits 83A-83D determine which (if any) of the four associative entries is selectable, and AND gates 84A-84D allow only the selection of a valid line entry (V=1) to determine if there is a cache hit or miss by a request address from the CP on lines 82. A cache hit in the congruence class in register 81 then activates one of the input lines to an OR circuit 86 to enable a cache hit line 87. If none of the input lines to OR circuit 86 is activated, a cache miss line 88 is enabled by an inverter receiving no signal from OR circuit 86.

The CP directories in the BCEs for CPs A and B have identical structure and control circuits. The copy directories 31A and 31B in the SC are also similar in structure to their corresponding CP directories, except that no change (CH) flag is found in the SC directories. Thus, on a XI operation, the SC can determine if the requested line is in any of its CDs. If it is not, as indicated by a XI miss, the SC does not signal any CP. If there is a XI hit, then the SC sends an invalidation command to its related CP directory with the directory location of the conflicting line and also sends a conflict signal for the requesting CP's private cache directory. Upon a CP receiving the invalidation command, the CPs directory examines the status of the change flag for that line. If the change flag is on, the line must be cast-out before invalidating it. If the change flag is off, the line can be invalidated immediately by turning off the valid flag (i.e. setting V=0).

FIG. 9 shows logic circuits in each BCE in FIG. 1 for handling cache requests from the respective CP and determining if the request can be handled in the CP's private cache (i.e. hit) or if a MS line fetch request (i.e. miss) must be sent to the SC, which accesses MS. In the case of a store request when the sharing flag is on (i.e. SH=1), both SIC and ST type of requests are generated to obtain storing of CP data in both the local cache and MS by signals on lines 213 and 214, respectively. The CH flag is turned on by line 212. A fetch hit is controlled by a signal on line 211. Lines 216 and 217 provide store and fetch requests to an SC for a line fetch (LF) from MS.

FIG. 8 shows SC to CP command logic circuits for receiving a line fetch (LF) storage request on line 216 and 217 or a store through request on line 214 from FIG. 9 to provide an appropriate conflict signal command to the BCE control circuits in FIG. 10. The BCE control circuits in FIG. 10 respond by invalidating the conflicting line in its CP directory after casting out the line if it was changed. The circuits in FIG. 8 are duplicated in the SC for each CD in the SC. In FIG. 9, for example, is the BCE for CP B, and it sends a store line fetch (LF) request on line 216B to the SC in FIG. 9, and the SC signals an XI hit in CP A in another CP (e.g. on line 59, then gate 232 outputs a store request conflict in CP A signal on line 242 to the BCE for CP A.

If there is no XI hit in any SC, then the store LF request from CP A is sent to MS by the SC circuits in FIG. 6, and no CP receives any conflict signal (i.e. no conflict condition is represented by no XI hit signal for the requesting CP). Lines 241-247 signal the different types of conflict situations for the different kinds of MS request conditions from the BCEs of CPs A and B.

FIG. 10 shows the BCE command response circuits in each CP. A conflict signal from the SC to a particular BCE causes the BCE to access its CP directory to examine the status of the line's change (CH) and sharing (SH) flags in AND circuits 252 and 251, respectively. Line 268 from OR circuit 258 enables an access to the cache directory when any type of conflict is signalled on line 241, 242 or 243.

If, for example, gate 251 receives a fetch request conflict in CP A signal on line 241, and a SH=0 signal on line 91 for a conflicting line in the CP directory for CP A, then the SH flag is turned on by a signal on line 261 in the CP directory to set the sharing state for the conflicting line. If line 93 indicates the CH flag is on for the conflicting line, it is then castout of that CP cache to MS by a control signal on line 263. But note that the conflicting line is left valid (i.e. V=1)in the related CP A cache for the fetch request because OR circuit 254 is not activated. The requesting cache in CP B can then fetch the castout line from MS, and its SH flag also is set on by the output of AND gate 55 in FIG. 5.

A store conflict is signalled by an output line 264 from the OR circuit 254 to the conflicting cache directory to invalidate the conflicting line. If the CH flag is on for the conflicting line, it is castout to MS via the SC under control of a signal on line 263 from gate 253.

When a XI hit occurs for any store request, the conflicting line is invalidated by a signal on lead 264, whether the request is a store-through or line miss request.

A store-through request occurs for a CP when it makes a store request to a line in the cache having its SH flag set to sharing state (SH=1). The store-through request is received by gate 233 or 237 in FIG. 5 which detects if the request caused a XI hit in another CP. If so, output line 243 or 247 signals a store-through request conflict to the conflicting CP. In FIG. 10, a store through conflict signal on line 243 passes through OR circuits 254 to turn off the valid flag, for the line in conflicting CP A, and AND gate 60 in FIG. 5 sets on the SH flag for the requesting line in CP B.

The CH flag should always be off (CH=0) when the SH flag is on. Consequently, a store-through XI hit with the CH flag on signals a machine check to the CP on lead 267 in FIG. 10.

When the related CP has completed the XI operations for the conflicting line, the CP signals the SC that the XI operation is complete.

While the invention has been particularly shown and described with references to a preferred embodiment thereof, it will be understood by those skilled in the art that the foregoing and other changes in form and details may be made therein without departing from the spirit and scope of the invention.

Having thus described my invention, what I claim as new and desire to secure by Letters Patent is:

1. Cache controls associated with central processors (CPs) in a multiprocessor (MP), in which the CPs share a main storage (MS), each CP having a cache and a CP directory with a plurality of line entries, each directory line entry including a change (CH) flag, a valid (V) flag and a MS address field for a corresponding line of data in the associated cache, the MP cache controls comprising:

each directory line entry also including a sharing (SH) flag settable to a sharing or non-sharing state, CP storage control means having line fetch means for fetching a line from MS when a store request or fetch request misses in the cache when a requested MS address field is not found in the associated CP cache directory, store-in-cache means with the CP storage control means for storing only into a selected line in the associated cache addressed by a CP store request when a selected SH flag is in a non-sharing state in a selected line entry in the cache directory, store-through means with the CP storage control means for enabling the CP to store into a selected line in both the cache and MS only if the SH flag is set to sharing state for the selected cache line entry, cross-interrogation (XI) means for broadcasting the MS address for a fetch request having a cache miss or for a store request either having a cache miss or having a cache hit with the selected SH flag being in a sharing state, the XI means signalling if any conflicting copy of the line is found in any other CP cache in the MP.

2. Cache controls for an MP as defined in claim 1, the CP control means further comprising:

means for setting the selected SH flag to a non-sharing state when a store request or a fetch request misses in the associated cache directory and no conflicting line is found by the XI means, but the setting means setting the SH flag to sharing state for a selected line entry in the associated cache directory when the XI means detects a conflicting copy of the line in another CP cache.

3. Cache controls for a MP as defined in claim 2, the CP storage control means further comprising:

the XI means requiring the SH flags for the conflicting line and the selected line to each be in a sharing state for a CP fetch request, the store-through means in each CP causing CP data stored into a selected line by a subsequent CP store request to also be stored into a corresponding line in MS and the change (CH) flag for the selected line remaining in unchanged state to indicate that the selected line is the same in both the selected cache and MS after the CP store request is completed.

4. Cache controls for a MP as defined in claim 3, the CP storage control means further comprising:

the XI means causing an associated V bit to be set to invalid state for a conflicting line found in a remote CP cache in response to a store request to a local CP cache.

5. Cache controls for a MP as defined in claim 4, the CP storage control means further comprising:

castout means with each CP cache directory for detecting if the CH flag is set to a changed state for a conflicting line and the castout means casting out the line to MS only if the line is in a changed state, and no further castout of the requested line being required from any cache in the MP during fetches and stores by plural CPs to the selected line while associated SH flags are set to sharing state.

6. Cache controls for an MP as defined in claims 1, 2, 3, 4, or 5, the XI means further comprising:

a plurality of copy directories in the MP respectively corresponding to the CP cache directories, a sharing (SH) flag being provided in each line entry in each copy directory for being tested during broadcasts by the XI means.

7. Cache controls associated with central processors (CPs) in a multiprocessor (MP) system, in which the CPs share a main storage (MS), each CP having a cache and a CP cache directory with a plurality of line entries, each line entry including a change (CH) flag, a valid (V) flag and an MS address field for representing states of a corresponding line of data in the associated cache, the MP cache controls comprising:

each line entry also including a sharing (SH) flag settable to a sharing or non-sharing state, means for detecting the states of the SH, CH and V flags in any line entry selected by an MS address of a CP store or fetch request, store-in-cache means with each cache directory for enabling any fetch or store request to fetch or store data into a requested line found in the cache regardless of the state of the SH flag, store-through means with each cache directory for enabling the CP to also store data of a store request into MS when the SH flag for a requested cache line is set to sharing state and the CH flag then being set to indicate an unchanged state, but the store-through means not storing data of a store request into MS when the SH flag is set to non-sharing state and the CH flag then being set to indicate a changed state of the line in the cache different from the corresponding line in MS, CP storage control means having line fetch means for fetching a requested line from MS into a requested cache upon a cache miss by a request, the V flag being set to valid state for the requested line fetched into the cache, cross-interrogation (XI) means for broadcasting the MS address field for a fetch or store request missing in the requested cache or a store request finding a requested line in the requested cache when the SH flag is set to sharing state in the selected line entry even though the store request does not miss in the requested cache, the XI means detecting if the requested line has a conflicting copy in any other CP cache in the MP, remote means for setting a V flag to invalid state in a remote CP cache directory entry for any conflicting line entry found in the remote cache directory due to a storage request, remote castout means for casting out any conflicting line only if a corresponding CH flag indicates a changed state for the conflicting line, local means for setting the SH flag to a shared state for the requested line being accessed by the fetch or store request to enable store-through operations on the requested cache line and the corresponding line in MS, so that any subsequent request to the line by another processor avoids requiring a subsequent castout of the line.

8. Cache controls for an MP as defined in claim 7, the MP cache controls further comprising:

the CP storage control means setting the SH flag to a non-sharing state for a requested line in a local cache when a fetch or store request does not find a requested line entry and the XI means does not find any conflicting line, but setting the SH flag to a sharing state if the XI means finds a conflicting line in a remote cache directory.

* * * * *